No. 871,074.　　　　　　　　　　　　　　PATENTED NOV. 12, 1907.
J. B. STOCKTON.
BATH APPARATUS.
APPLICATION FILED OCT. 15, 1906.
2 SHEETS—SHEET 1.
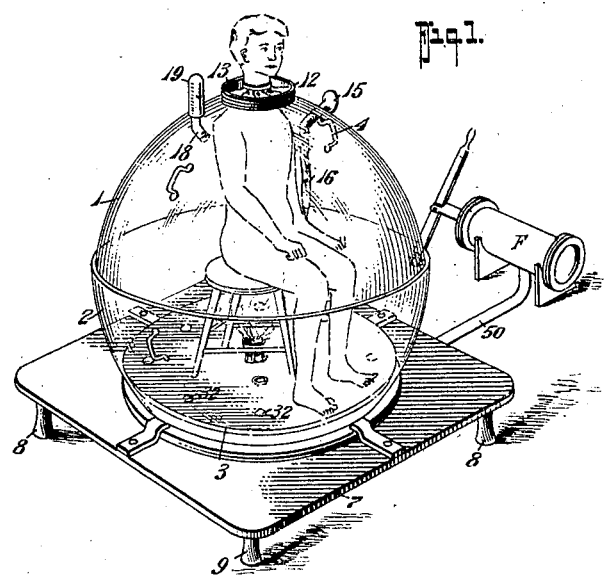
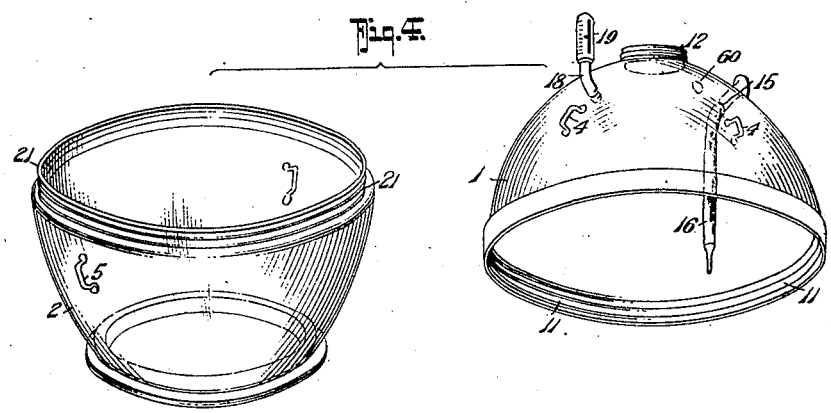
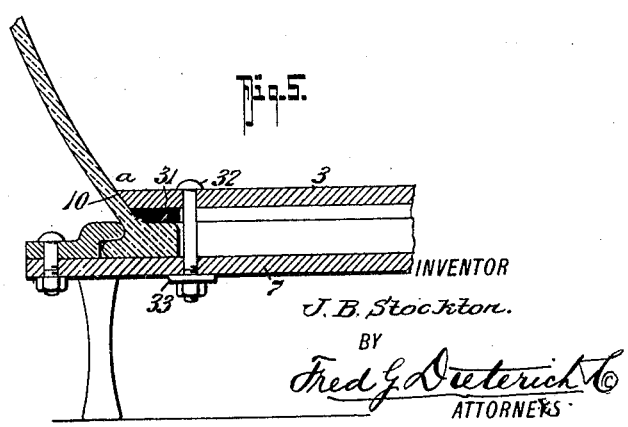
WITNESSES:
John T. Schrott
F. C. Gibson
INVENTOR
J. B. Stockton.
BY
Fred G. Dieterich
ATTORNEYS No. 871,074.
PATENTED NOV. 12, 1907.
J. B. STOCKTON.
BATH APPARATUS.
APPLICATION FILED OCT. 15, 1906.
2 SHEETS—SHEET 2.
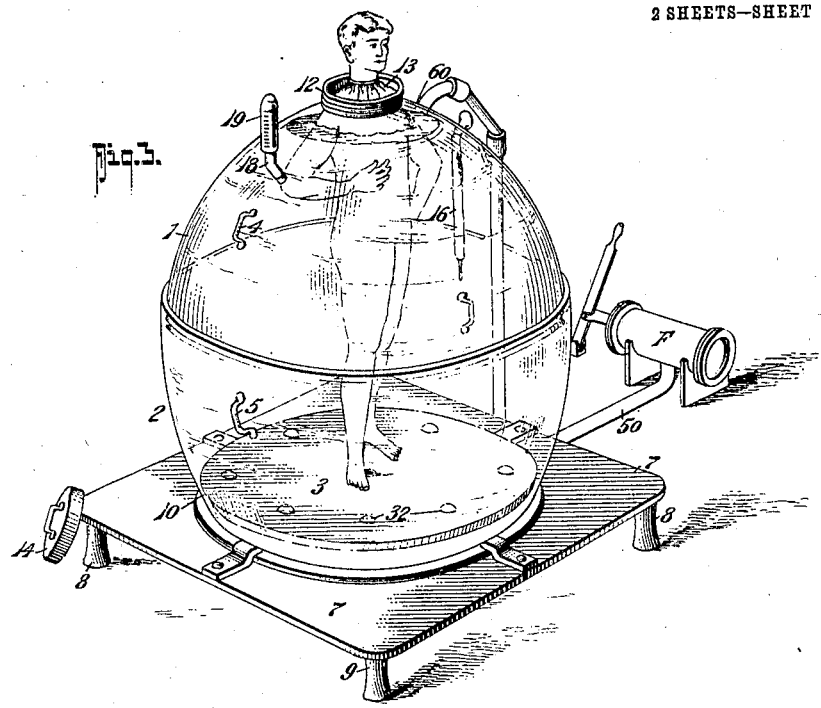
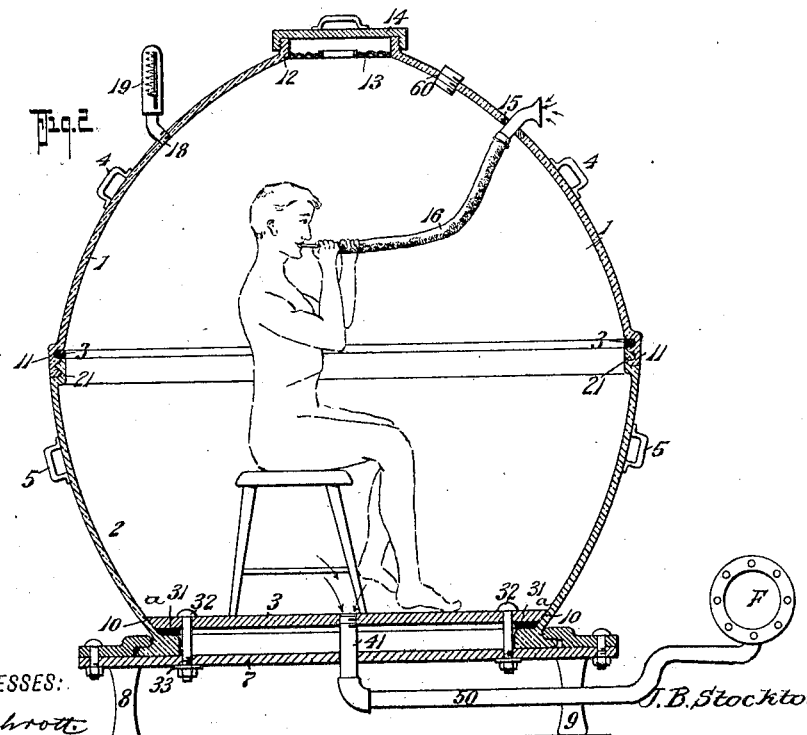

UNITED STATES PATENT OFFICE.

JOSEPH B. STOCKTON, OF JOHN DAY, OREGON, ASSIGNOR OF TWO-FIFTHS TO THOMAS P. STOCKTON, OF MOUNT VERNON, OREGON.

BATH APPARATUS.

No. 871,074.        Specification of Letters Patent.        Patented Nov. 12, 1907.

Application filed October 15, 1906. Serial No. 339,122.

*To all whom it may concern:*

Be it known that I, JOSEPH B. STOCKTON, residing at John Day, in the county of Grant and State of Oregon, have invented a new and Improved Bath Apparatus, of which the following is a specification.

My invention seeks to provide an improved construction of portable apparatus that can be conveniently utilized for incasing all of the human body, applying a vacuum about it and providing for supplying the oxygen to the body from the lungs only, whereby to drive poison out of the system and which can be also readily utilized as a thermal or sweat bath or as an apparatus for impregnating the body with medicaments.

My invention generally comprehends a receptacle of suitable shape, preferably bowl, formed of two half sections adapted to be joined air tight, and preferably of glass, the upper section of which is provided with suitable openings for connecting therewith the air feed 2, pressure gage devices, the opening for the head and means therein for fitting the neck air tight in the said opening, the lower section being suitably constructed and provided with means for detachably sustaining the apparatus on a suitable support and for detachably receiving the bottom portion upon which the patient rests while receiving treatment.

In its more subordinate features, my invention consists in certain details of construction and peculiar combination of parts, all of which will be hereinafter fully explained, specifically pointed out in the appended claims and illustrated in the accompanying drawings, in which:—

Figure 1, is a perspective view of my invention, showing the apparatus arranged as a thermal bath. Fig. 2, is a vertical section thereof, showing the apparatus arranged as a vacuum bath. Fig. 3, is a similar view of a slightly modified form of my invention and showing the manner in which my invention may be utilized as a means for impregnating the parts of the body with medicaments. Fig. 4, is a perspective view of two bowl sections and bottom members separated. Fig. 5, is a detail sectional view of a part of the bottom bowl section, the bottom member and the means for detachably connecting the bowl and the bottom members.

In the practical construction, my apparatus consists substantially of a receptacle, sufficiently large to entirely incase the human body when sitting, and all the body, except the head, when standing, and the said receptacle can be made of various shapes in cross section and of any suitable material, but I prefer to make the same of a bowl shape, of two substantially half sections 1 and 2, formed of glass.

The bowl sections 1 and 2 have their joining ends provided with threads as at 11 and 21 whereby the said two sections can be conveniently joined and rendered fluid and air tight, a gasket 3 being provided between the meeting ends of the bowl sections as shown and to provide for easily adjusting the two sections 1 and 2 they have handles 4 and 5, as clearly shown.

The upper section 1, in the crown thereof, has a head opening 12 which is provided with a flexible closure 13 for engaging the neck of the patient when my apparatus is being used as a thermal bath as shown in Fig. 1 and with a cap plate 14 for closing said opening 12 fluid tight, when my apparatus is used as a medical or vacuum bath. The upper section 1 is also provided with an opening 15 to which is fitted a flexible air tube 16 used for conveying air to the mouth of the patient as shown in Figs. 1 and 3 and 18 designates another opening in the said top section 1 to which is joined a tube 70 having a pressure gage 19 which indicates the vacuum or forced pressure within the bowl.

In the preferred form, the lower end of the bowl section 2 is straight and is widened at the ends and sides to firmly seat upon a suitable base or supporting means 7, mounted on legs 8 and 9, and this base, in practice, is fitted within the bowl from the top and has its ends and sides 10 shaped to firmly seat against the inner wall of the bowl sections 2 whereby to make fluid tight connection between the parts *a* and a suitable gasket or packing 31 is interposed between the said two parts, which in practice, is held compressed to form a positive closure, by reason of the clamp screws 32 that receive the clamping member 33 that bears against the outer edge of the lower member of the bowl as will be clearly understood from the drawings.

Centrally the bottom 3 is provided with a tubular neck 41 for detachably receiving the pump tube 50 to which any approved type of force pump F is joined.

By reason of the peculiar construction and combination of parts shown and described, it will be apparent that when it is desired to give the patient an ordinary thermal bath treatment, the pump tubing is disconnected from the tubular neck 41 which now becomes an air inlet for the receptacle.

The patient steps into the lower bowl section 2 and after applying the heating or vapor lamp, the upper bowl section is slipped over his head and is made fast to the lower section 2 and if desired the mouth fitting tube may be now also utilized as an air feed to the receptacle.

When used as a vacuum bath, the bowl is attached to the neck 41 as shown and the upper bowl section is fit above the head of the patient who now assumes a sitting posture, the head opening in the upper section being now closed by the cover plate.

The patient inhales through the mouth tube and the operator, by working the pump and drawing off the air from the receptacle, creates a vacuum which causes the pores of the patient to open and thereby draws off poison from the body through the pores and at the same time filling the system with fresh oxygen.

When it is desired to utilize the apparatus as a means for impregnating parts of the body with medicaments, the upper section is provided with a supplemental pump opening 50 and the lower or neck portion 41 is closed.

All parts of the body of the patient are now incased except the head which extends above the upper casing section through the opening and the receptacle is filled with a suitable liquid.

Air pressure is then forced into the receptacle by the pump which causes the medicaments contained in the bath liquid to penetrate the skin.

While I have shown my apparatus as particularly adapted for treating patients standing or sitting, it is manifest that the same may be arranged to be applied to the patient while in a lying position.

Having thus described my invention, what I claim and desire to secure by Letters Patent, is:—

1. In an apparatus of the character described, the combination with the two part receptacle comprising an upper section having an inwardly extended air feed tube, a head opening and a closure member therefor, the lower section having an open supporting base, the two sections having means for making an air tight connection; of a bottom portion detachably fitted over the bottom of the lower section and supported on the inside thereof, means for clamping said bottom in position, said bottom having a pendent tubular neck and a pump detachably connected to the said pendent neck, all being arranged substantially as shown and described.

2. An apparatus for the purposes described, consisting of the following parts in combination; a two part receptacle, comprising an upper and a lower section, the two sections having interlocking threaded flanges, the upper section having an air feed tube, a head opening and a closure member therefor, the lower member having an open base, a solid bottom support on which the said lower section seats, means for firmly clamping it on the said support, a flat bottom adapted to fit within the said bottom section, the latter having an inwardly projected rim, on which the solid bottom rests and means for closing the said bottom down air tight on the said flanges.

JOSEPH B. STOCKTON.

Witnesses:
J. E. MARKS,
ORIN L. PATTERSON.